(12) United States Patent
Singer et al.

(10) Patent No.: US 7,903,573 B2
(45) Date of Patent: Mar. 8, 2011

(54) METHOD AND SYSTEM FOR NETWORK TRAFFIC MATRIX ANALYSIS

(75) Inventors: Joshua Singer, Cambridge, MA (US); Hani El-Sakkout, Sudbury, MA (US); Vassilios Liatsos, Arlington, MA (US); Frederick Serr, Concord, MA (US)

(73) Assignee: Cisco Technology, Inc., San Jose, CA (US)

( * ) Notice: Subject to any disclaimer, the term of this patent is extended or adjusted under 35 U.S.C. 154(b) by 1403 days.

(21) Appl. No.: 11/345,093

(22) Filed: Feb. 1, 2006

(65) Prior Publication Data
US 2007/0177506 A1 Aug. 2, 2007

(51) Int. Cl.
*H04L 12/26* (2006.01)
(52) U.S. Cl. .................... 370/252; 370/255; 709/224
(58) Field of Classification Search ............ 370/229, 370/235, 241, 252, 254, 255; 709/238, 241, 709/242, 224
See application file for complete search history.

(56) References Cited

U.S. PATENT DOCUMENTS

| | | | |
|---|---|---|---|
| 6,061,331 A * | 5/2000 | Conway et al. | 370/232 |
| 6,560,204 B1 | 5/2003 | Rayes | |
| 6,785,240 B1 | 8/2004 | Cao et al. | |
| 7,302,482 B2 * | 11/2007 | Rodosek et al. | 709/224 |
| 2004/0218529 A1 | 11/2004 | Rodosek et al. | |
| 2005/0286434 A1 * | 12/2005 | McKee et al. | 370/252 |

FOREIGN PATENT DOCUMENTS

WO WO 03/075512 9/2003

OTHER PUBLICATIONS

Fast Accurate Computation of LargeScale IP Traffic Matrices from Link Loads.*
Yin Zhng et al., "Fast Accurate Computation of Large-Scale IP Traffic Matrices from Link Loads", Sigmetrics'03, Jun. 10-14, San Diego, CA.

* cited by examiner

*Primary Examiner* — Chi H Pham
*Assistant Examiner* — Weibin Huang
(74) *Attorney, Agent, or Firm* — Cindy Kaplan

(57) ABSTRACT

A method and system for calculating data traffic flow in a communications network are disclosed. The communications network comprises a plurality of nodes including a plurality of source nodes, a plurality of destination nodes, and a plurality of intermediate nodes. Each of the intermediate nodes includes at least one elbow comprising one ingress interface and one egress interface of the intermediate node. The method includes obtaining local data traffic measurements at each of the elbows, wherein the local data traffic measurements comprise data traffic arriving at the intermediate node via the ingress interface and leaving the intermediate node via the egress interface. The local data traffic measurements are used in calculation of the traffic flow and may be used, for example, to generate data traffic matrix information using data traffic matrix inference or data traffic matrix estimation.

44 Claims, 8 Drawing Sheets

METHOD AND SYSTEM FOR NETWORK TRAFFIC MATRIX ANALYSIS

BACKGROUND OF THE INVENTION

The present invention relates generally to communication networks, and more specifically, to network traffic matrix analysis.

A traffic matrix is the set of bandwidths of all end-to-end flows across a network. The information provided by a traffic matrix is critical in a number of network planning tasks. While some interior routing technologies such as MPLS-TE allow fairly convenient collection of the traffic matrix, many operators of large networks run OSPF (Open Shortest Path First) or IS-IS (Intermediate System to Intermediate System) as the core interior routing protocol. In such a context, a complete traffic matrix is not readily available. In practice, information about the traffic matrix must be pieced together from a number of different sources.

Another option for collection of the traffic matrix is to use Cisco IOS NetFlow (available from Cisco Systems, Inc. of San Jose, Calif.), in which routers collect flow information and export raw or aggregated data. NetFlow software for traffic monitoring or hardware traffic probes can be installed around the perimeter of the core and provide very detailed traffic matrix information. However, an approach based purely on NetFlow or hardware probing is not appropriate for all network operators.

Traffic matrix analysis can be performed using observations of traffic at a local device level, such as link loads. Traffic matrix inference is one traffic matrix analysis technique used for obtaining information about the traffic matrix. Traffic matrix inference is the construction of a logical system which captures what is known about the traffic matrix from observation and routing data. Traffic matrix inference is used to describe inference techniques that are applied when the network operator has only a partial view of the traffic traversing the network, but wishes to extend this partial view to a more complete view. Using certain computational techniques, sound inferences can be made about the traffic matrix. One way to do traffic inference is to construct a linear constraint system to model the topology, routing, and local traffic observations. The true traffic matrix must be consistent with the topology, routing, and traffic observations and must therefore satisfy the constraints. Using linear constraint solvers one can therefore reason about the true traffic matrix.

An example of traffic matrix inference is described in U.S. Patent Publication No. 2004/0218529, entitled "Traffic Flow Optimisation System", published Nov. 4, 2004, which is incorporated herein by reference in its entirety. The system uses linear programming solvers to construct a constraint system (referred to as TFM (Traffic Flow Model)) from local link load traffic observations.

U.S. Pat. Nos. 6,061,331 and 6,560,204 also use linear programming to perform traffic matrix analysis from local observations and routing data. The method of U.S. Pat. No. 6,061,331 uses measurements made over multiple disjoint time periods of traffic coming into the network at each node and measurements of traffic on each link. The method subsequently uses these measurements to set up linear programming problems for finding an approximate source-destination traffic matrix that optimally fits the measured data. The model used in the U.S. Pat. No. 6,560,204 is not tractable enough to be solved directly and requires iterative fitting. The methods described above are all designed for use with link measurements.

Traffic matrix inference can be used to compute maximum and minimum bounds for the bandwidth of each flow. Due to the fact that the constraint system is usually very under constrained, these bounds normally leave a very wide margin of uncertainty for the actual value of each flow. Traffic matrix inference is therefore often combined with other traffic matrix analysis techniques, such as traffic matrix estimation, in which heuristics can be used to identify a definite traffic matrix that is consistent with the constraint system and is a reasonable approximation of the actual, unknown traffic matrix.

Traffic matrix estimation consists of generating concrete estimates for the elements in the traffic matrix. A conventional estimation heuristic, known as the "gravity approach", relies on local observations about ingress and egress traffic at each edge node. These observations are combined with the "gravity assumption" and the constraint system to give definite values for the matrix (see, for example, "Fast Accurate Computation of Large-Scale IP Traffic Matrices from Link Loads", Yin Zhang et al., ACM SIGMETRICS, June 2003).

As described above, conventional systems perform traffic matrix inference using link observations. Furthermore, traffic matrix estimation heuristics such as the gravity approach only use traffic observations at the edge nodes. These narrow sets of observations provide only limited accuracies in traffic matrix analysis.

BRIEF DESCRIPTION OF THE DRAWINGS

Corresponding reference characters indicate corresponding parts throughout the several views of the drawings.

DESCRIPTION OF SPECIFIC EMBODIMENTS

Summary

A method and system for calculating data traffic flow in a communications network are disclosed. The communications network comprises a plurality of nodes including a plurality of source nodes, a plurality of destination nodes, and a plurality of intermediate nodes. Each of the intermediate nodes includes at least one elbow comprising one ingress interface and one egress interface of the intermediate node. In one embodiment, a method generally comprises obtaining local data traffic measurements at each of the elbows, wherein the local data traffic measurements comprise data traffic arriving at the intermediate node via the ingress interface and leaving the intermediate node via the egress interface. The local data traffic measurements are used in calculation of the traffic flow and may be used, for example, to generate data traffic matrix information using data traffic matrix inference or data traffic matrix estimation.

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein.

Methods and systems of the present invention provide traffic matrix inference and estimation for data communication networks. In one embodiment, network traffic matrix inference and estimation is performed using observations from "elbows". An elbow consists of one ingress interface and one egress interface on the same router. As described below, traffic flowing through an elbow is measured to provide an elbow-based TFM (Traffic Flow Model) which leads to a tighter inference constraint system than provided using conventional link observations (link-based TFM). In another embodiment, network traffic matrix estimation is performed using Path Load Feedback (PLF). Elbow-based TFM may be combined with PLF to provide a more accurate estimation of the actual traffic matrix. Also, elbow-based TFM may be combined with other estimation heuristics, such as a conventional gravity estimation function. PLF may also be combined with link-based TFM.

Network and Input Data

Figure 1:
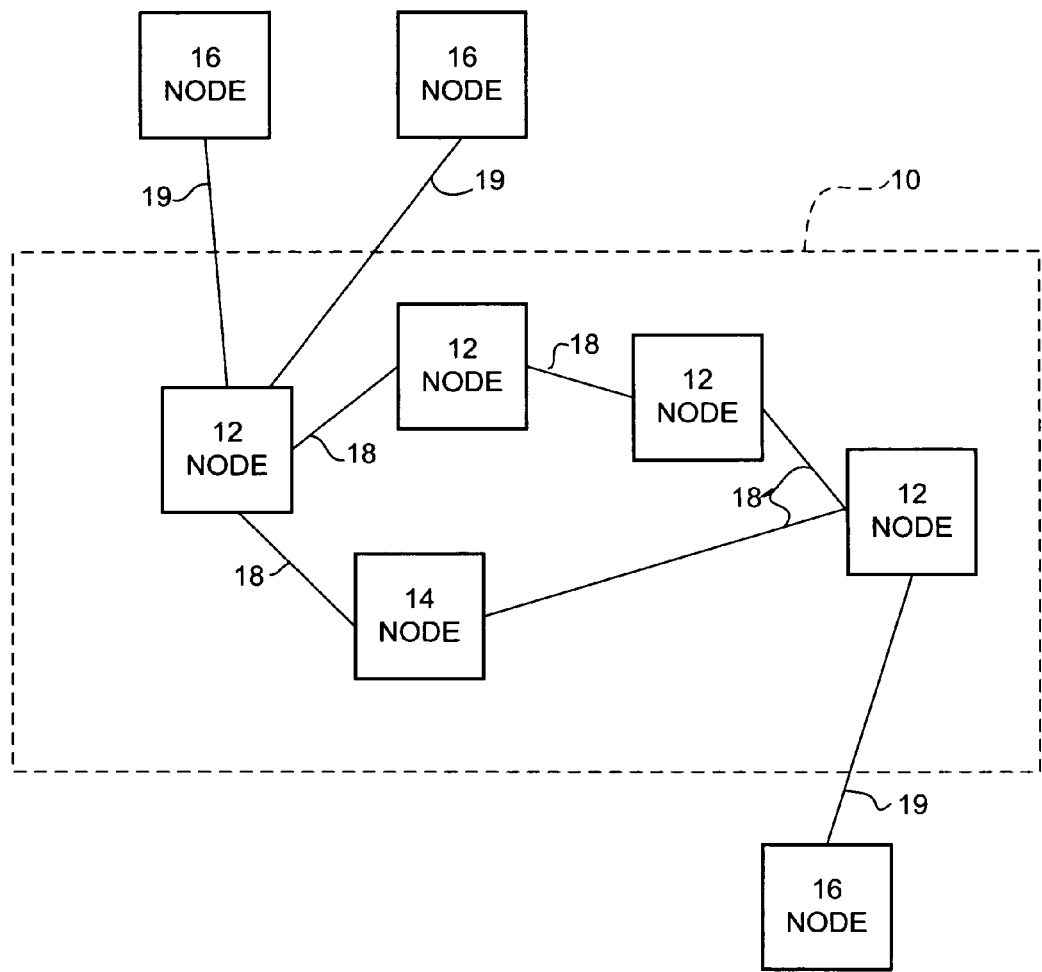
FIG. 1 illustrates a simplified example of a network in which the present invention can be implemented.

FIG. 1 illustrates a simplified example of an Internet Protocol (IP) network 10 in which the present invention can be implemented. The network includes multiple network elements or nodes 12, 14, 16. Some of the elements in the network may be network devices such as routers and switches. For example, some of the nodes may be specially configured routers such as those available from Cisco Systems, Inc. of San Jose, Calif. As used herein the term router is used to refer to devices that forward packets based on network and higher layer information. The router may be implemented on a general purpose network host machine such as a network device described below with respect to FIG. 8.

Nodes in the network may either be internal or external. An internal node represents a location in the network where traffic data is directed through the network 10. It may be a network device 12, such as a router, or a network node 14 denoting a local network (e.g., Ethernet, FDDI ring). External node 16 represents a connection to the IP network 10 from other networks. The nodes are connected by links 18, 19. The link may be, for example, a backbone link 18 or an access link 19 (e.g., peering line, uplink lines, customer lines). A path from a source to a destination node is a sequence of linked nodes (intermediate nodes) between the source and destination nodes. A route is a path between source and destination nodes of a network that follows a given routing protocol.

One of the nodes 16 may include a network management system which performs network management functions of the network. The network management system communicates with the network using a network management protocol, such as Simple Network Management Protocol (SNMP). The system of the present invention may operate at a network management station or any other network device.

It is to be understood that the network shown in FIG. 1 and described above is only one example, and that other networks having different configurations may be used without departing from the scope of the invention.

Input data for the traffic matrix inference/estimation system includes traffic data and network data, which are used to derive constraints and optimization functions, as described below. Traffic data may be collected from routers and router interfaces and includes traffic flow between two nodes, flow between two groups of interfaces for two nodes, the traffic entering or leaving a link, or traffic entering or leaving an interface of a node, for example. The traffic data is preferably collected for a certain time interval and collected on a regular basis. Traffic data may be collected, for example, from network management protocol tables stored in the network management system. Traffic data may also be collected with respect to different OSI layers (such as IP and TCP).

Network data contains information about the nodes, routers, links, router interfaces, bandwidth of each link, or the parameters of the routing protocol used. The routing protocol may be, for example, OSPF (Open Shortest Path First) protocol. Alternatively, other routing protocols such as IS-IS (Intermediate System to Intermediate System) and EIGRP (Enhanced Interior Gateway Routing Protocol) may be used. In addition, information about the transport layer may be used, such as the TCP transport protocol or the UDP transport protocol. Network data may also include a list of static routes or information about the end-to-end path such as all shortest paths.

The system may include, for example, a traffic flow analyzer which uses information about the IP network topology and measurements of the traffic flow in order to calculate upper and lower bounds of data traffic flow of any route between two nodes. An example of a traffic flow analyzer is described in U.S. Publication No. 2004/0218529, referenced above, and incorporated herein by reference in its entirety.

The methods and systems described herein for traffic matrix inference and estimation may be used in route monitoring or IGP metrics tuning, for example. They may also be used in a flow optimization system such as described in International Patent Application No. PCT/GB03/0069, entitled "Method and System for Constraint-Based Traffic Flow Optimisation System" (Publication No. WO 03/075512), which is incorporated herein by reference in its entirety. The flow estimation may be a subset of network flows or an aggregation of network flows. The methods and systems described herein may be also be used in routing (e.g., to modify network topology following a failure), resilience checking, and congestion control, for example.

The systems and methods described herein for calculating data traffic flow in a communications network use various local traffic measurements including routing and topology data, as described in detail below. The systems and methods may utilize traffic matrix inference, traffic matrix estimation, or a combination thereof to generate a traffic matrix. The local traffic measurements may also be used to calculate aggregate flow in at least a portion of the network. The calculated aggregate flow may be an estimated aggregate flow or aggregate flow bounds. For example, upper and lower bounds of data traffic may be calculated from one or more source nodes to one or more destination nodes using the local traffic measurements.

Traffic Matrix Inference and Estimation

The following describes methods and systems of the present invention for performing network traffic matrix inference and estimation. In one embodiment, an elbow-based traffic flow model is used for traffic matrix inference. In another embodiment, the elbow-based traffic flow model is used with an optimization function such as a gravity function or path load feedback for traffic matrix estimation to further improve traffic matrix accuracy. In another embodiment, path load feedback is used by itself for traffic matrix estimation. The path load feedback can be performed using link or elbow traffic observations and also uses routing data. In yet another embodiment, a link-based traffic flow model is used with path load feedback.

The traffic flow models used for traffic matrix inference are first described below, followed by the traffic matrix estimation functions. As discussed above, these methods can be combined to improve accuracy of the traffic matrix.

Link-Based TFM

An example of a link-based TFM is described in U.S. Patent Publication 2004/0218529, referenced above. The following provides a summary of the topology and routing data, and link traffic observations used in a link-based TFM system and the constraint system model.

The link-based TFM uses two sets of inputs: topology and routing data; and link traffic observations. The raw routing data indicates the set of links which each flow traverses in the network. The links can form a simple path or a more complicated "lattice" with splitting and merging paths.

For simple networks (e.g., single-area OSPF (Open Shortest Path First)), the raw routing data is calculated by simulating the interior protocol given the network topology and link metrics. For more complicated scenarios, the routing data is calculated by correlating the routing tables of all the core routers. Alternatively, tools which monitor the routing protocol control packets and keep a historical view of the routing may be used.

The raw routing data is processed into more detailed flow proportion routing data for use in the TFM. This provides information on what proportion of each traffic flow is routed over each interface in the network. An algorithm is used to compute this data under the assumption of perfect Equal Cost Multiple Path (ECMP) load balancing (described below). The proportion of a flow exiting each router on each of the next hop links is equal to the proportion entering the router divided by the number of next hop links. This flow proportion routing data is independent of the bandwidth of each flow. For example, if a particular end-to-end flow has two disjoint ECMP paths leading from its ingress to its egress node, the routing data records a proportion of 0.5 for each of the outgoing interfaces in each of these two paths.

The link traffic observations record the total number of bytes sent over a single interface in the network. In one embodiment, SNMP is used to obtain this data, through traps or polling.

The time granularity over which the link traffic statistics are collected depends on the operator. For example, it is possible in principle to monitor link loads constantly and produce a new traffic matrix estimate every few minutes. Alternatively, the operator may prefer to select a "representative" period over which traffic is collected (e.g., one hour per week), produce one traffic matrix for that period by averaging link traffic or taking a percentile, and use only that matrix for network planning.

The flow crossing each link is known from the routing data. From the link traffic observations, it is known how much the total of these flows is. The main constraint can then be defined to constrain the sum of the flows to be equal to the observed link traffic. The following describes the constants and variables used in the constraint equations.

Constants:
V: set of all nodes;
V': edge nodes (subset of V);
V'×V': set of all ordered pairs of edge nodes or the set of all flows;
L: set of all links;
i: denotes a link in L;
u, v: denotes nodes in V;
(u,v): denotes the flow from u to v;
$a_{u,v,i}$: proportion of flow from u to v which is routed over link i; and
$b_i$: observed bandwidth of traffic crossing link i.

The routing data provides $a_{u,v,i}$ and the link traffic observations provide $b_i$.

Variable:
$x_{u,v}$: bandwidth of the end-to-end flow from u to v.

Constraints:
For each u,v in V:

$$x_{u,v} \geq 0$$

For each i in L:

$$\sum_{u,v \in V' \times V'} a_{u,v,i} x_{u,v} = b_i$$

The set of solutions to this constraint system is the set of traffic matrices whose $x_{u,v}$ entries are non-negative and which are consistent with the link observations $b_i$.

The constraint system resulting from the above equations typically contains a wide range of different traffic matrices. This range of possible traffic matrices can be explored by optimizing the variables with respect to a particular objective function expression. This is done by passing the constraint system and objective function to a linear programming solver such as ILOG CPLEX, available from ILOG of Mountain View, Calif.

The simplest objective function minimizes or maximizes a particular flow bandwidth $x_{u,v}$. This will give the flow bounds: the maximum and minimum bandwidth values a flow could take given the routing and link traffic observations. Due to the fact that the constraint system is usually very under-constrained, these bounds normally leave a very wide margin of uncertainty for the actual value of each flow. The constraint system is therefore preferably combined with other traffic matrix estimation techniques, such as PLF described below.

Elbow-Based TFM

The link-based TFM described above is based purely on link bandwidth observations. The elbow-based TFM of the present invention provides a more constrained system, using more detailed local traffic observation data. In addition to recording the number of bytes which are sent over an interface, the router also classifies and measures the traffic based on how it passes across the device. A packet moving through a network device enters via one interface and exits via another. An elbow is a combination of ingress and egress interfaces such that each packet traversing the device traverses a particular elbow. The elbows play a similar role to links in the traffic flow model.

Figure 2:
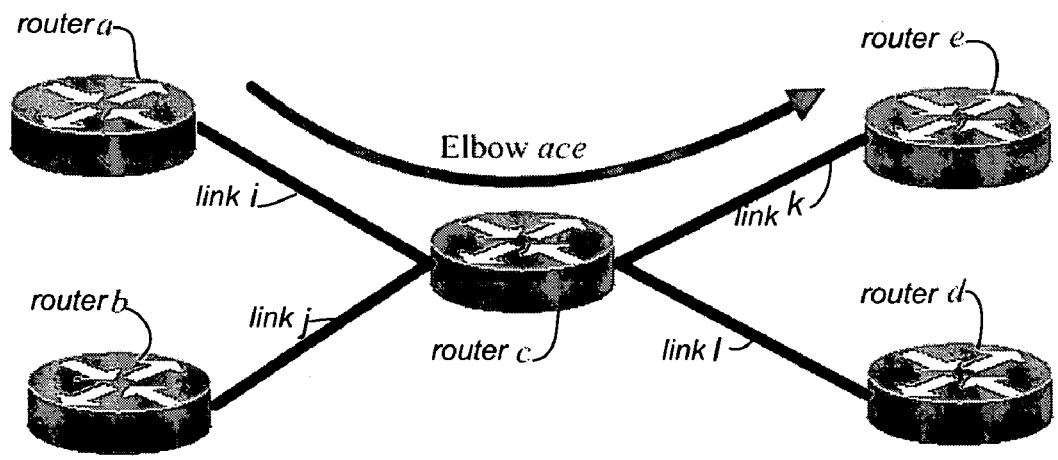
FIG. 2 illustrates a router with twelve elbows.

FIG. 2 illustrates an example of an elbow ace. In FIG. 2, five routers a, b, c, d, and e are connected by links i, j, k, and l. The elbow may be referred to by the pair of links (e.g., (i, k)) which comprise the elbow or by naming the three participating routers in the order traversed (e.g., (ace)). In general, a router with n interfaces has n(n−1) elbows. The router c shown in FIG. 2 has four interfaces (links i, j, k, and l). The router therefore has 4(4−1)=12 elbows (acb, acd, ace, bca, bcd, bce, dca, dcb, dce, eca, ecb, and ecd).

The flow proportion routing data required by the elbow TFM needs to provide information on what proportion of each traffic flow is routed over each elbow in the network.

Figure 3:
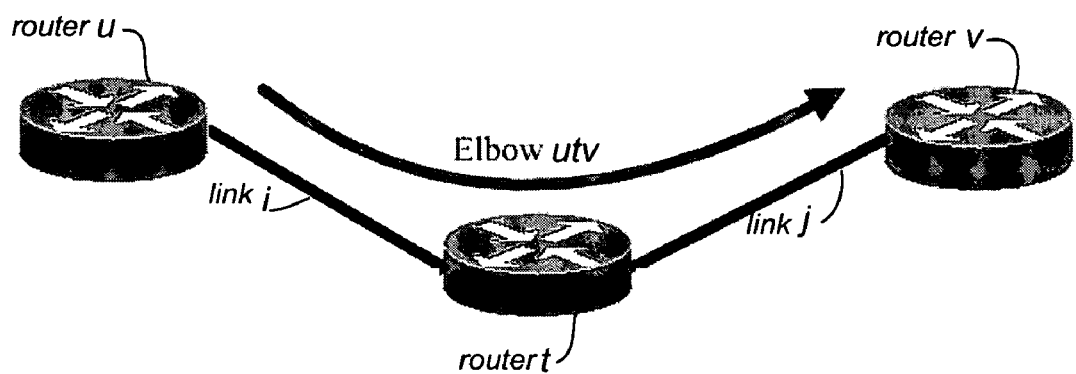
FIG. 3 illustrates an example of an elbow used in elbow-based TFM calculations.

An example is described below for elbow (utv) shown in FIG. 3. A flow with source node u and destination node v traverses elbow (utv) at intermediate node t. Links i and j define the elbow and the central router in the elbow is router t. The link j is a "next hop link" at router t for destination v. There may be several such next hop links if ECMP load balancing occurs at t for traffic with destination v. For each flow from u to v, the raw routing data gives the proportion $a_{u,v,i}$ of each flow on each link i, according to the operation of the interior protocol. For the elbow-based TFM, the flow proportion routing data is generated for each elbow from the link-based flow proportion data. The proportion of flow which crosses the elbow equals $a_{u,v,i}$ divided by the number of next hop links at t for destination router v.

The traffic observation statistic for an elbow records the total number of bytes switched by the router between the incoming and outgoing links comprising the elbow. Measurements for different time granularities may be made. A new SNMP MIB may be defined to record elbow-based traffic measurements. An alternative approach is to use NetFlow (version 9) configured to aggregate solely on the basis of ingress and egress interface. This approach would require NetFlow to be enabled on every router in the network.

The flows which are crossing each elbow are known from the routing data. From the elbow traffic observations, it is known how much the total of these flows is. The sum of the flows is constrained to be equal to the observed elbow traffic. The following describes the constants and variables used in the constraint equation.

Constants:
V: set of all nodes;
V': edge nodes (subset of V);
V'×V': set of all ordered pairs of edge nodes or the set of all flows;
E: set of all elbows;
i: denotes a link;
u, v: denotes nodes in V;
(u,v): denotes the flow from u to v;
(i,j): denotes an elbow in E;
$c_{u,v,i,j}$: proportion of flow from u to v which is routed over elbow (i, j); and
$d_{i,j}$: observed bandwidth of traffic crossing elbow (i, j).

The routing data provides $c_{u,v,i,j}$ and the link traffic observations provide $d_{i,j}$.

Variable:
$x_{u,v}$: bandwidth of the end-to-end flow from u to v.

Constraints:
For each (i, j) in E:

$$\sum_{u,v \in V' \times V'} c_{u,v,i,j} x_{u,v} = d_{i,j}$$

It is preferred to include all the link-based TFM constraints in the elbow-based TFM constraint system. This is because of the presence of "one hop flows", which are flows that only have paths of length one across the core. The one hop flows do not traverse any elbows, since elbows are of length two. Without the presence of the link-based TFM constraints, these one hop flows would not play any role in the model.

Additional ingress/egress node traffic constraints may also be used. A service provider typically controls and monitors the network not only in the core, but also beyond the endpoint nodes further towards the edge. Thus, in addition to observations of the traffic on core links, observations of the traffic on edge links are also normally available. The traffic on these edge links is either about to enter the core at a particular node, or has just left the core at a particular node. The network operator therefore knows the total amount of traffic joining or leaving the core at that particular node, by looking at the traffic on these links.

For each node v, there are two extra constants:
$p_v$: sum of all traffic entering the core at node v; and
$q_v$: sum of all traffic exiting the core at node v.

This gives two extra constraints on the flow bandwidth variables:

For each u in V:

$$\sum_{v \in V} x_{u,v} = p_u$$

For each v in V:

$$\sum_{u \in V} x_{u,v} = q_v$$

It should be noted that these additional node ingress/egress constraints may also be used in the link-based TFM described above.

At least one known flow in the system may be used to further refine the set of constraints.

Figure 4:
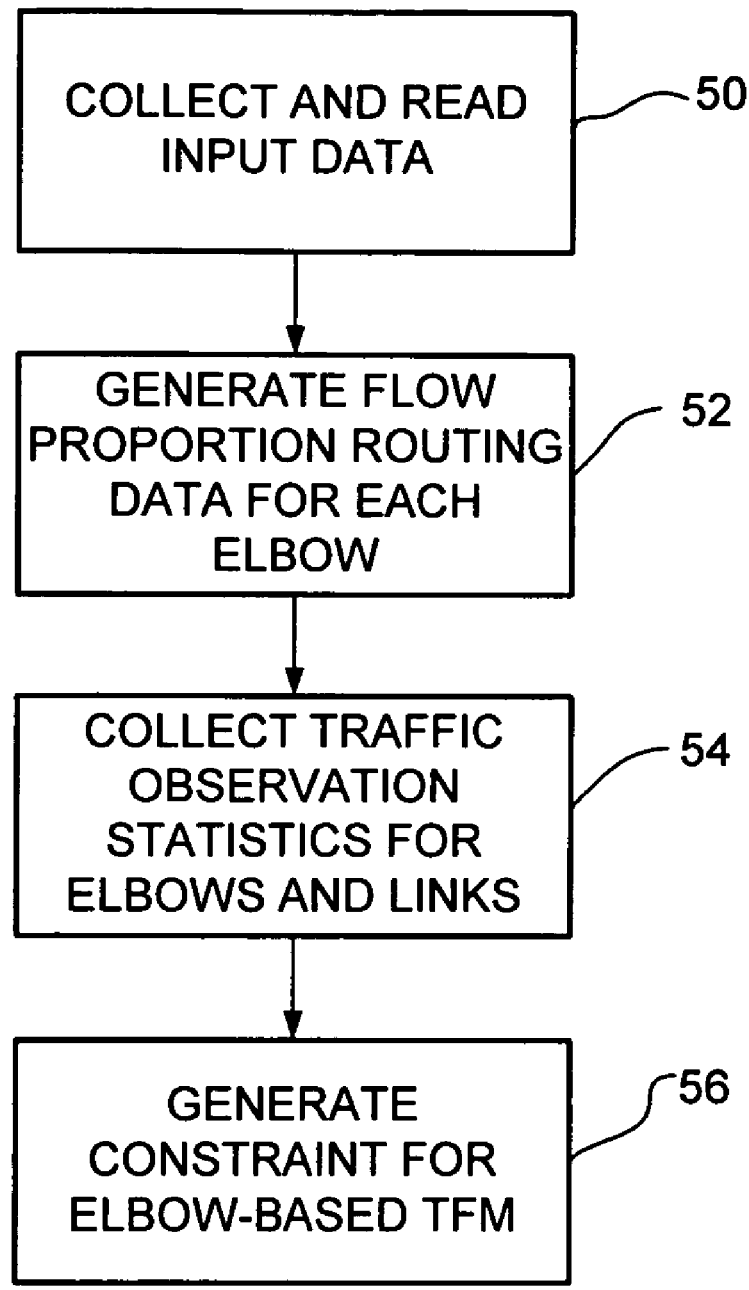
FIG. 4 is a flowchart illustrating a process for analyzing traffic flow according to an elbow based traffic flow model.

FIG. 4 is a flowchart illustrating a traffic matrix inference process utilizing elbow-based TFM. Input data is first collected and read at step 50. The input data is used to calculate the proportion of flow that crosses each elbow (step 52). At step 54 traffic observation statistics are collected. The traffic observation statistic for an elbow records the total number of bytes switched by the router between the incoming and outgoing links comprising the elbow. The constraints for the elbow-based TFM is then generated using the routing data and elbow traffic observations (step 56).

As can be observed from the foregoing, the elbow-based TFM is a stronger constraint system than the link-based TFM. The set of traffic matrices that the elbow-based TFM allows is a subset of those allowed by the link-based TFM.

The elbow-based TFM makes an assumption about the operation of ECMP load balancing. ECMP is the interior protocol mechanism used by OSPF and IS-IS to load balance traffic over paths of equal cost. ECMP is typically deployed using "per-session hashing". When there are multiple paths of equal cost, per-session hashing determines which next hop link each packet will use. The intention is to split the traffic for a given destination equally over all of the next hop links for that destination, which are on equal cost paths. In per-session hashing, certain keys of each packet (source/destination IP address, etc.) are "hashed" together to give a small integer (typically a 4-bit number). This integer determines which of the available next hop links the packet will use. A particular TCP/IP session, for example, will always hash to the same number and therefore will always use the same path through the network. However, with a network carrying thousands of sessions, the hashing splits the traffic roughly equally due to the law of averages. The notion that this equal splitting is achieved is the "perfect load balancing assumption". This is generally considered a reasonable assumption because for large operators sessions are fine-grained in comparison to the size of flows. A distinct assumption is the "independent load balancing assumption."

Figure 5:
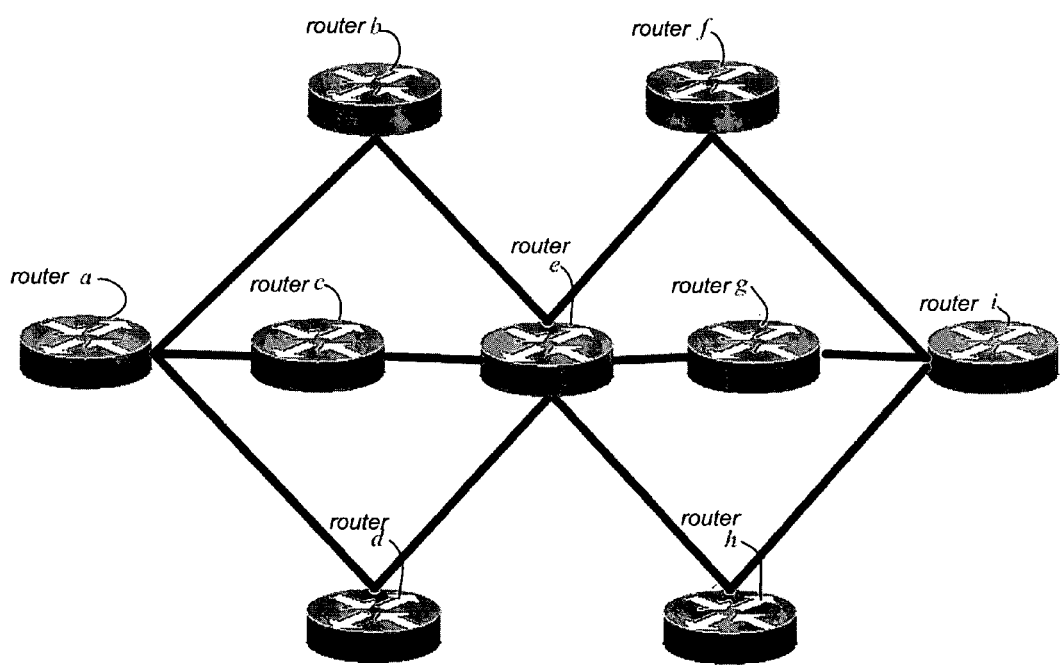
FIG. 5 is a network illustrating an independent load balancing assumption.

The following describes the independent load balancing assumption in reference to a network shown in FIG. 5. The network includes nine nodes (a, b, c, d, e, f, g, h, i). Suppose all links have equal IGP metrics and we are considering a flow from node a to node i. One third of the flow from a to i comes into node e on line be, one third on link ce, and one third on de. One third of the flow exits e on link ef, a third on link eg and the other third on link eh. These flow link proportions follow from the assumption of perfect load balancing at a and e.

There are nine relevant elbows through node e: bef, beg, beh, cef, ceg, ceh, def, deg and deh. Now consider what happens when using the method of deriving elbow-oriented flow proportions from link-oriented flow proportions. For the flow from a to i, we expect a proportion of ⅑ on each of the nine elbows. This is calculated by dividing the proportion of the flow on the elbow's incoming link (⅓) by the number of outgoing next hop links (3). Therefore we have to assume not only perfect load balancing but also independent load balancing. That is, we must assume that (averaged over the population of all packets multiplexed into the flow from a to i) the next hop link which node e chooses for destination i is independent from the next hop link which node a chose for destination i.

If necessary, ECMP load-balancing could be made independent, by adding a router-specific component into the hashing inputs (e.g., the router's loopback address).

If load balancing is not independent, as an example e might treat the packets belonging to the flow from a to i as follows. All those arriving via be are sent over ef, all those arriving via ce are sent over eg and all those arriving via de over eh. This is still perfect load balancing, it is just that now the hashing decisions of e and those of a are not independent. This would mean the proportion of the flow from a to i over elbow cef is actually zero, rather than ⅑. In this case, the calculations would rest on the erroneous assumption that ⅑ of the flow is represented in the observed traffic for elbow cef, when actually it is not.

The assumption is only a problem when ECMP is used to such an extent that a flow splits, remerges and splits again. The correlation of load-balancing decisions between devices, if there is any, is merely a contingent artifact of the router software implementation and the router ECMP behaviour could be implemented so as to justify the assumption.

The following describes a variant of the elbow-based TFM which does not rely on the independent load balancing assumption described above.

In a network with ECMP, a packet belonging to a particular flow takes one of several equal cost paths. Calculating the set of all possible paths for a flow in an OSPF or IS-IS context is straightforward. In a variant model (not using the independent load balancing assumption), in addition to a variable $x_{u,v}$ per flow, there is also a "path-flow" variable for each path of each flow. This new variable represents the part of the flow bandwidth which flows down a particular path.

The variant model assumes perfect load-balancing. Therefore, at the source router for the flow the sum of the path-flow variables on a particular next hop link is constrained to be equal to the main flow variable divided by the number of next hop links. At each router where ECMP occurs, the sum of the path-flow variables for a particular flow on a particular next hop link is constrained to be equal to the sum of the incoming path-flow variables divided by the number of next hop links at that router.

In the elbow-based TFM which relies on the independent load balancing assumption, the constant $c_{u,v,i,j}$ represents proportion of the flow from u to v which is routed over elbow (i, j). In the variant model, these constants are not used, since removing the independent load-balancing assumption means that it is not known how much of each flow is routed over each elbow. Instead there are 0/1 constants which represent whether a particular path of a particular flow traverses a given elbow. These can be calculated from the paths themselves. Then the main constraint of the system of the variant model is as follows. For each elbow, the sum of path-flow variables for all paths of flows which traverse an elbow is constrained to be equal to the observed traffic on that elbow. This constraint system is stronger than the link-based TFM but weaker than the elbow-based TFM which relies on the independent load balancing assumption.

As discussed above, traffic flow models (link or elbow-based) may produce wide ranges for each flow bandwidth. Thus, estimation functions may be used to identify traffic matrices within the constraint system which are more likely estimates. The link-based TFM or elbow-based TFM may be combined with path load feedback, gravity approach, or any other traffic matrix estimation method.

Path Load Feedback

Path Load Feedback (PLF) is a traffic matrix estimation technique. It may be used to select a concrete traffic matrix which is consistent with a constraint system such as the link-based or elbow-based TFM. It is an alternative to the gravity approach, described below. Whereas the gravity approach is based on ingress and egress traffic statistics for each node, the PLF approach is based on the full set of link or elbow traffic observations and it also uses the routing data. In the following example, link traffic observations are used. However, PLF may also be used with elbow traffic observations.

In PLF, traffic load measurements are taken from the network. The traffic loads may be observed for particular elements in the network. For example, where the observed elements are links, link load observations may be collected. Feedback from network measurements is used together with routing data to weight an objective function for each flow. The objective function can be solved directly and quickly using a standard linear programming solver, as is well known by those skilled in the art.

There are two hypotheses behind PLF:
1) Information about the size of a flow can be drawn from local observations along the length of the path or paths which it takes. That is, a large flow will tend to be correlated with local observations of high traffic along its paths; a small flow will tend to be correlated with observations of less traffic along its paths.
2) Traffic flows which constitute a local observation are unlikely to exhibit extreme size variance. In fact, in the absence of any other information, a good estimate for the flow values is that they are equal.

The two hypotheses combine together to form PLF. On the one hand there are several local estimates of a flow. Each one originates from a local observation, and estimates that all flows involved in that estimation are equal (hypothesis 1). For a given flow there will be many different local estimates along the paths of that flow. For this flow, a compromise must be made between these local estimates (hypothesis 2).

Figure 6:
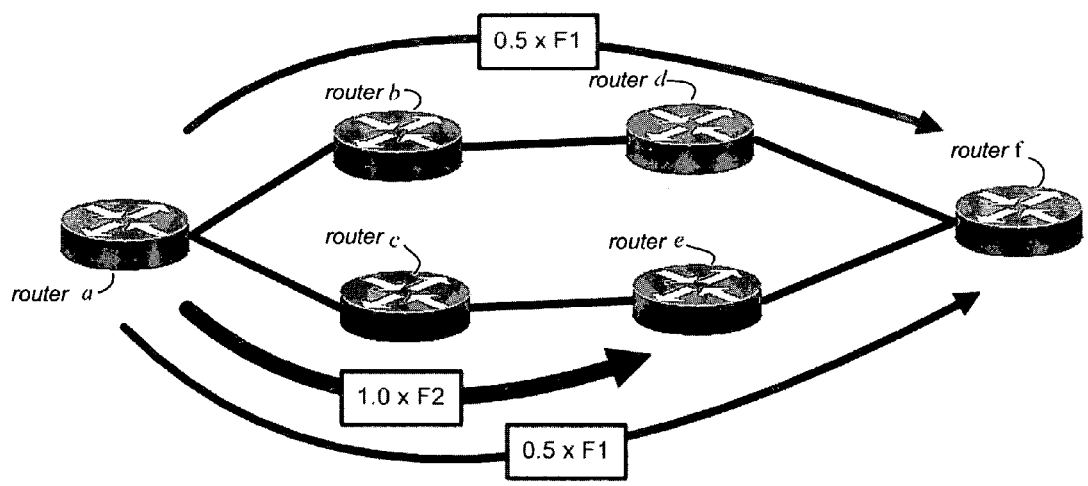
FIG. 6 illustrates an example of path load feedback.

The following example describes PLF for the network shown in FIG. 6. The network includes 6 routers a, b, c, d, e, f. There are two flows in the network, F1 and F2. Flow F1 has source a, destination f, and is load balanced over two paths (a,c,e,f) and (a,b,d,f). F2 has source a, destination e and follows a single path (a,c,e).

On link ce, 150 units of bandwidth are observed. It is also known from the routing data that this link carries traffic belonging to two flows: half the traffic belonging to flow F1 traverses link ce and all of the traffic belonging to flow F2 traverses link ce. One interpretation consistent with the observations is that half of the observed traffic may be due to F1 and the other half to F2. In the absence of any other information, the bandwidth of F1 is estimated to be 150 and the bandwidth of F2 is estimated to be 75. For flow F1 the estimate is 150 because it is assumed that the link carries 75 units which belong to F1 and it is known from the routing data that only half of flow F1 traverses link ce.

The same procedure is then followed for each link in the network. Other links may also carry flows F1 and F2. The estimates of F1 and F2 which come from these links may well differ from the estimate produced from link ce. Table 1 shows the observations and estimates for F1 and F2 on the different links.

TABLE 1

| LINK | TRAFFIC OBSERVATION | F1 ESTIMATE | F2 ESTIMATE |
| --- | --- | --- | --- |
| ab | 25 | 50 | n/a |
| ac | 150 | 150 | 75 |
| bd | 25 | 50 | n/a |
| ce | 150 | 150 | 75 |
| df | 25 | 50 | n/a |
| ef | 25 | 50 | n/a |

Different links give potentially different local estimates of each of the flows which traverses that link.

It turns out in this simple case that the link-based traffic flow model alone can correctly identify both flows exactly, F1=50, F2=125. However in the general case the TFM does not give such concrete information and this is where the estimation technique PLF helps.

The PLF technique provides a method for finding concrete estimates for F1 and F2 which are not too distant from the estimates based on each link. PLF finds a global compromise which is within the constraint system, but which is at a minimum distance from the local estimate.

The constants used in the implementation are defined as follows:

$F_i$: set of flows on link i;
(u,v): denotes the flow from u to v;
$a_{u,v,i}$: proportion of flow from u to v which is routed over link i;
$b_i$: observed bandwidth of traffic crossing link i; and The variables used in the implementation are defined as follows:

$x_{u,v}$: bandwidth of the end-to-end flow from u to v;
$o_{u,v,i}$: absolute difference between variable $x_{u,v}$ and the local estimate of link i on the value of flow (u,v).

The absolute operator cannot be used directly in linear programming. A way to achieve the same effect is to introduce two constraints per variable $o_{u,v,i}$:

For each link i in L, for each flow (u, v) in $F_i$:

$$o_{u,v,i} \geq \frac{b_i}{|F_i|} - a_{u,v,i} \times x_{u,v}$$

$$o_{u,v,i} \geq a_{u,v,i} \times x_{u,v} - \frac{b_i}{|F_i|}$$

Then the objective function is:

$$\text{minimize} \left( \sum_{i \in I} \sum_{(u,v) \in F_i} o_{u,v,i} \right)$$

Figure 7:
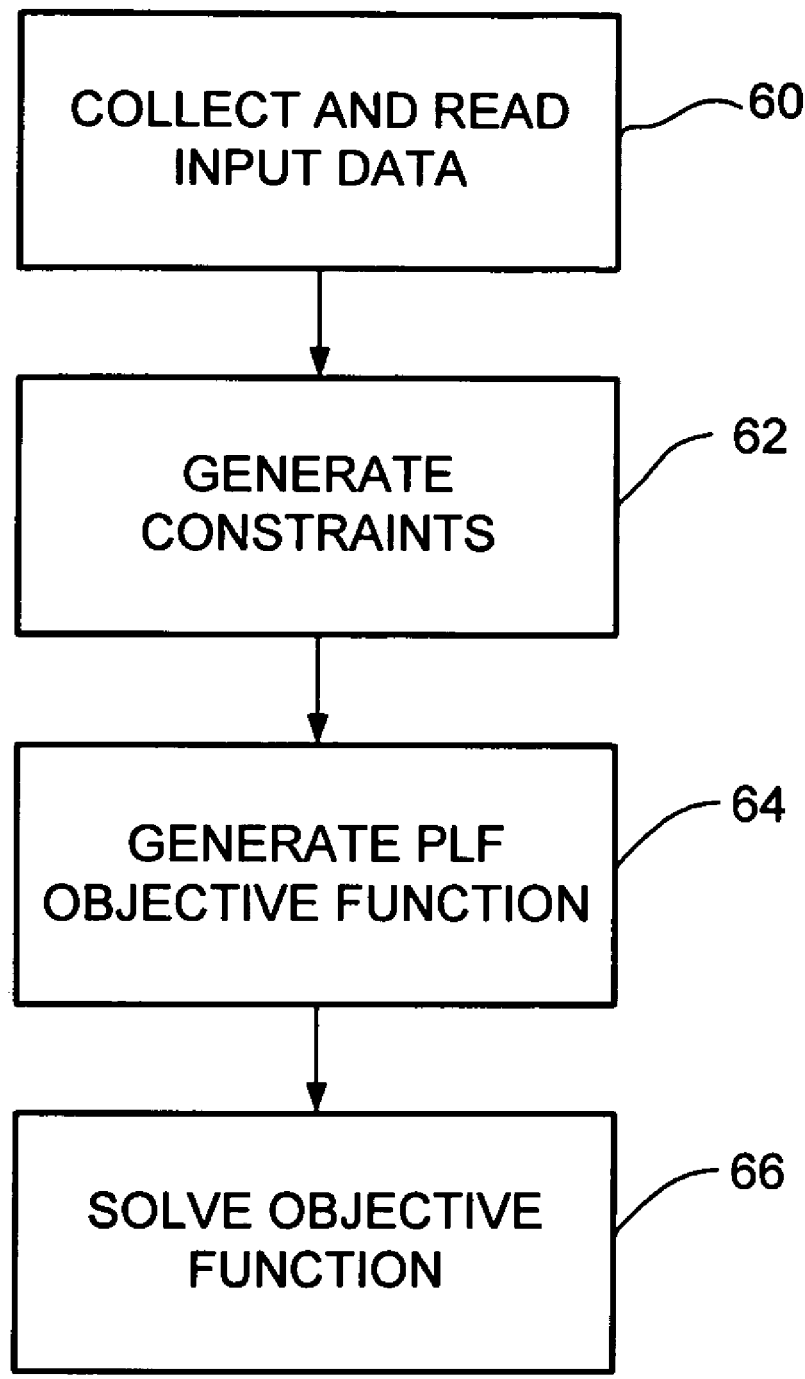
FIG. 7 is a flowchart illustrating a process for estimating traffic flow according to a path load feedback technique.

FIG. 7 is a flowchart illustrating a process for estimating a traffic matrix utilizing PLF. At step 60, input data is collected and read. Constraint equations are generated at step 62. The PLF objection function is then generated (step 64). The objective function is solved using a standard linear programming solver (step 66).

A link-based model ("link-PLF") is described above. The "link-PLF" has one cost variable per link-flow pair (where the flow traverses the link). It requires only link observation data. The use of PLF generalizes to an elbow-based model ("elbow-PLF"). Where there is one variable per link and flow $o_{u,v,i}$, a variable per elbow and flow $o_{u,v,i,j}$, is introduced, and the objective function is calculated as follows for elbow-PLF:

For the elbow-PLF, the constants used in the implementation are defined as follows:

E: the set of all elbows;
$F_{(i,j)}$: set of flows which traverse elbow (i,j);
(u,v): denotes the flow from u to v;
$a_{u,v,i,j}$: proportion of flow from u to v which is routed over elbow (i,j);
$b_{(i,j)}$: observed bandwidth of traffic crossing elbow (i,j); and The variables used in the implementation are defined as follows:

$x_{u,v}$: bandwidth of the end-to-end flow from u to v;
$o_{u,v,i,j}$ absolute difference between variable $x_{u,v}$ and the local estimate of elbow i,j on the value of flow (u,v).

The elbow-PLF uses all the constants, variables and constraints of the link PLF. Two additional constraints are introduced per variable $o_{u,v,i,j}$:

For each elbow i,j in E, for each flow (u, v) in $F_{i,j}$:

$$o_{u,v,i,j} \geq \frac{b_{i,j}}{|F_{i,j}|} - a_{u,v,i,j} \times x_{u,v}$$

$$o_{u,v,i,j} \geq a_{u,v,i,j} \times x_{u,v} - \frac{b_{i,j}}{|F_{i,j}|}$$

Then the objective function (which includes the link-PLF objective) is:

$$\text{minimize} \left( \sum_{i \in I} \sum_{(u,v) \in F_i} o_{u,v,i} + \sum_{(i,j) \in E} \sum_{(u,v) \in F_{i,j}} o_{u,v,i,j} \right)$$

Elbow-PLF has all the cost variables of the link-PLF plus one cost variable per elbow-flow pair (where the flow traverses the elbow). The elbow-PLF requires both link and elbow observation data.

Either variant of PLF (link-PLF or elbow-PLF) can be combined with a link-based TFM or an elbow-based TFM (which includes constraints based both on link and elbow observations) or a PLF linear program can be set up with no TFM.

Gravity Estimation Function

As discussed above, the elbow-based TFM may be combined with a conventional gravity estimation function. The gravity approach is a technique that has been used on its own as a method to predict a traffic matrix from limited observational data. The gravity approach requires the two observations of total ingress and total egress traffic at each flow endpoint node ($p_v$ and $q_v$). Given these observations for all flow endpoints, the gravity approach gives a definite value for each flow bandwidth. For a flow from node u to node v, the gravity estimate ($g_{u,v}$) is defined as follows:

$$g_{u,v} \equiv p_u \frac{q_v}{\sum_{w \in V} q_w}$$

This says that of the traffic with source node u, the proportion which has destination v equals the proportion of network traffic generally which has destination v.

The gravity estimation function can be combined with any constraint system which constrains the variables $x_{u,v}$ (e.g., link-based TFM or elbow based TFM). The idea is to find the traffic matrix inside the constraint system which brings the flow variables as close as possible to the gravity approach estimates. This is achieved by constructing an optimization scenario in which the difference between the flow variable and the gravity estimate is minimized. There are a few different ways to construct this expression. One example is as follows.

First, an error variable $e_{u,v}$ is defined for each flow from node u to node v. This represents the absolute difference between the gravity estimate and the flow bandwidth variable. As described above for PLF, the absolute operator cannot be used directly in linear programming. Two constraints are introduced per error variable:

For each pair u, v in V'×V':

$$e_{u,v} \geq g_{u,v} - x_{u,v}$$

For each pair u, v in V'×V':

$$e_{u,v} \geq x_{u,v} - g_{u,v}$$

The optimization function passed to a linear programming optimizer is:

$$\text{minimize} \left( \sum_{u,v \in V' \times V'} e_{u,v} \right)$$

This tells the linear programming solver to minimize the sum of absolute differences. The traffic matrix returned is therefore the closest traffic matrix to the gravity estimate which is still consistent with the observational data.

Network Device

Figure 8:
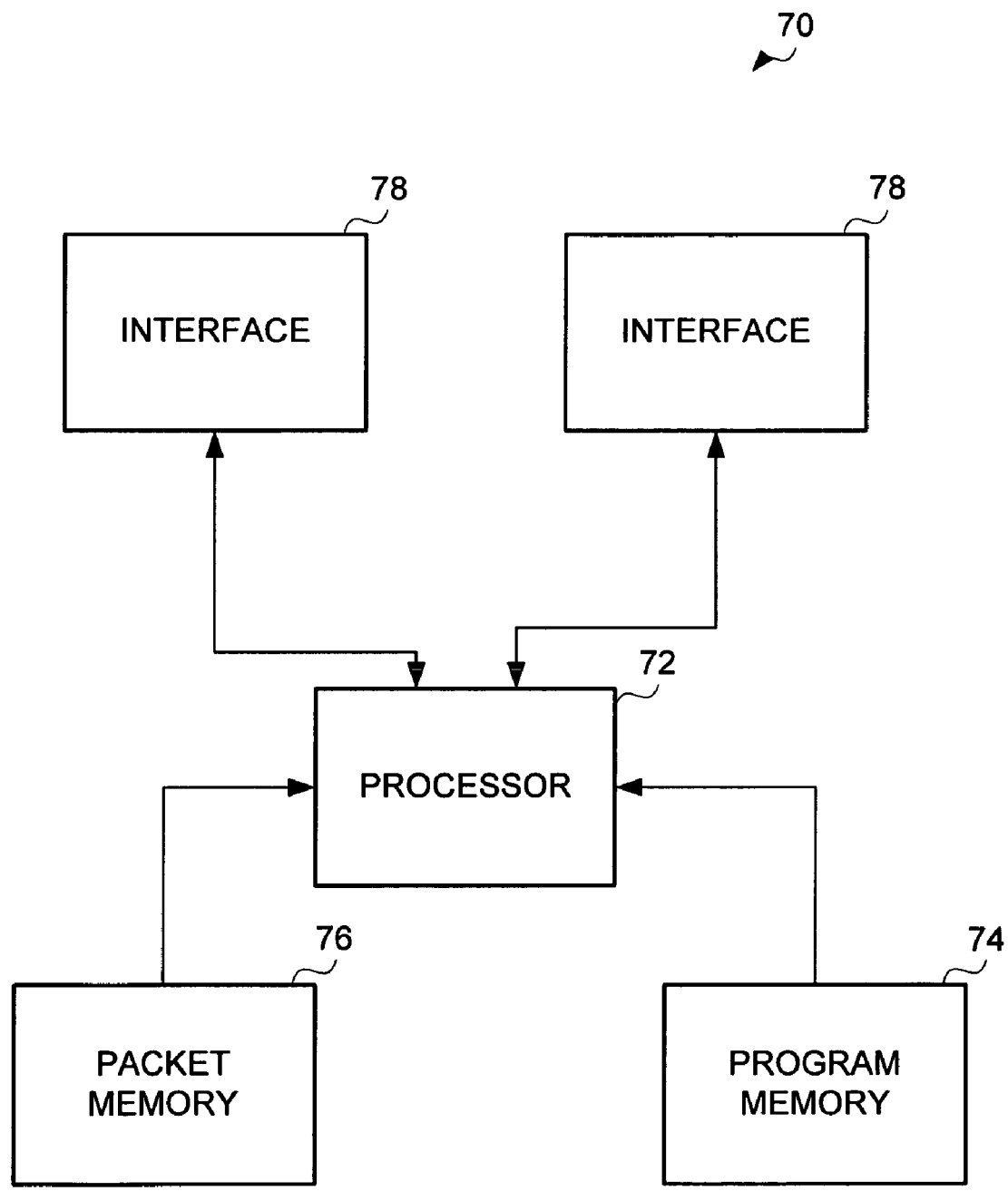
FIG. 8 is a block diagram of one example of a network device for use in implementing embodiments of the present invention.

FIG. 8 depicts a network device 70 that may be used to implement the method and system described above. In one embodiment, network device 70 is a programmable machine that may be implemented in hardware, software, or any combination thereof. A processor 72 executes code stored in a program memory 74. The code may control the operation of an operating system or one or more applications, for example. Program memory 74 is one example of a computer-readable medium. Program memory 74 can be a volatile memory. Another form of computer-readable medium storing the codes may be some type of non-volatile storage such as floppy disks, CD-ROMs, DVD-ROMs, hard disks, flash memory, etc.

Network device 70 interfaces with physical media via a plurality of network interfaces 78. The interfaces 78 are typically provided as interface cards (sometimes referred to as "linecards"). Generally, they control the sending and receiving of data packets over the network and sometimes support other peripherals used with the network device 70. As packets are processed and forwarded by network device 70, they may be stored in a packet memory 76. Packet transmission operations may occur partially or completely within one of linecards. The interfaces 78 generally include ports appropriate for communication with the appropriate media. To implement functionality according to the present invention, linecards may incorporate processing and memory resources similar to those discussed above in connection with the network device 70 as a whole. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, and the like.

Network device 70 shown in FIG. 8 is only one example of a network device suitable for use with the invention. Other devices and systems having different configurations of subsystems may also be utilized.

Experimental Results

The following experimental results illustrate principles and advantages of the invention.

Data was obtained from four different service provider networks and included full topology information, link IGP metrics, and a full actual traffic matrix. The IGP metrics were used to derive a single-area IGP routing with ECMP load balancing and this provided the routing constants.

For each network, the traffic flow model was varied (none; link-based TFM; elbow-based TFM) and the estimation approach was varied (gravity; link-PLF; elbow-PLF).

Data was compared using the normalized root squared error (NRSE) as follows:

$x_1, \ldots, x_n$: N entries in the actual matrix for a particular network;

$\hat{x}_1, \ldots, \hat{x}_n$: corresponding values estimated by one of the techniques;

$$NRSE = \frac{\sqrt{\sum_{i=1}^{N} (\hat{x}_i - x_i)^2}}{\sum_{i=1}^{N} x_i}$$

The elbow-based TFM is known to be a more constrained system than the link-based TFM. When combined with either the gravity or PLF estimation approach, the elbow-based TFM provided better estimates than the link-based TFM or no TFM.

As long as the elbow-based TFM is used, the elbow-PLF technique was either the most accurate technique or only slightly less accurate than the most accurate technique. The elbow-PLF was found to be a generally good choice of estimation heuristic to use with the elbow-based TFM.

What is claimed is:

1. A method of calculating at a network device, data traffic flow in a communications network comprising a plurality of source nodes, a plurality of destination nodes, and a plurality of intermediate nodes, each of said plurality of intermediate nodes including at least one elbow comprising one ingress interface and one egress interface of one of the intermediate nodes, the method comprising:

obtaining local data traffic measurements at each of said elbows, wherein said local data traffic measurements comprise data traffic flowing through the elbows based on data traffic arriving at the intermediate node via said ingress interface and leaving the intermediate node via said egress interface; and performing at a processor at the network device, said data traffic flow calculations utilizing said local data traffic measurements;

wherein obtaining said local data traffic measurements comprises classifying and measuring said data traffic based on how said data traffic passes across the intermediate node, said measuring comprising measuring a proportion of said data traffic routed over each of the elbows.

2. The method of claim 1 wherein utilizing said local data traffic measurements comprises generating data traffic matrix information.

3. The method of claim 2 wherein generating data traffic matrix information comprises utilizing data traffic matrix inference.

4. The method of claim 2 wherein generating data traffic matrix information comprises utilizing data traffic matrix estimation.

5. The method of claim 2 wherein said data traffic matrix information comprises data for a subset of flows traversing the network.

6. The method of claim 2 further comprising generating end-to-end data traffic flow estimates.

7. The method of claim 6 wherein generating said end-to-end data traffic flow estimates comprises utilizing a gravity estimation function.

8. The method of claim 6 wherein generating said end-to-end data traffic flow estimates comprises utilizing a path load feedback estimation function.

9. The method of claim 2 wherein generating data traffic matrix information comprises utilizing topology and routing data.

10. The method of claim 9 wherein utilizing topology and routing data comprises determining what proportion of data traffic flow passes over said elbows.

11. The method of claim 2 wherein the data traffic matrix information comprises data for aggregate flows comprising a plurality of individual flows which traverse the network.

12. The method of claim 11 wherein said data for aggregate flows comprises estimates of said aggregate flows.

13. The method of claim 11 wherein said data for aggregate flows comprises bounds on said aggregate flows.

14. The method of claim 13 further comprising performing resiliency checks in the network.

15. The method of claim 11 further comprising generating aggregate flow estimates and wherein said aggregate flow estimates are based on said local data traffic measurements and data traffic flow estimation.

16. The method of claim 15 wherein generating said aggregate flow estimates comprises utilizing a gravity estimation function.

17. The method of claim 15 wherein generating said aggregate flow estimates comprises utilizing a path load feedback estimation function.

18. The method of claim 1 wherein utilizing said local data traffic measurements comprises generating a set of constraints.

19. The method of claim 18 further comprising utilizing linear programming to solve said set of constraints.

20. The method of claim 18 wherein generating a set of constraints comprises generating a constraint equation according to:

$$\sum_{u,v \in V' \times V'} c_{u,v,i,j} x_{u,v} = d_{i,j}$$

wherein:
$V' \times V'$: set of all ordered pairs of edge nodes or set of all flows;
i,j: links connected to the intermediate node;
$c_{u,v,i,j}$: proportion of flow from source node u to destination node v routed over elbow i,j;
$d_{i,j}$: observed bandwidth of data traffic crossing elbow i,j; and
$x_{u,v}$: variable representing the bandwidth of flow from source node u to destination node v.

21. The method of claim 18 further comprising generating a second set of constraints based on the sum of data traffic entering and exiting the network at an edge node.

22. The method of claim 18 further comprising generating a second set of constraints based on data traffic flow through links connecting said nodes.

23. The method of claim 18 further comprising utilizing at least one known flow in the system to further refine said set of constraints.

24. A method of calculating at a network device, data traffic flow in a communications network comprising a plurality of source nodes, a plurality of destination nodes, and a plurality of intermediate nodes, each of said plurality of intermediate nodes including at least one elbow comprising one ingress interface and one egress interface of the intermediate node, the nodes being connected to one another by links, the method comprising:

obtaining local data traffic measurements including proportion of data traffic flow from one of said source nodes to one of said destination nodes which is routed over each of said elbows, and observed bandwidth of data traffic crossing each of said elbows;

determining local estimates of flow for each of said elbows using said local data traffic measurements; and calculating at a processor at the network device, end-to-end data traffic flow estimates based on said local flow estimates.

25. The method of claim 24 wherein calculating end-to-end data traffic flow estimates comprises utilizing an optimization function.

26. The method of claim 25 wherein utilizing an optimization function comprises applying a weight to each flow in a set of network flows.

27. The method of claim 25 further comprising solving a linear programming problem utilizing said optimization function.

28. The method of claim 25 wherein said optimization function is based on the difference between the observed bandwidth of data traffic crossing said elbow divided by the number of flows on said elbow and the proportion of data traffic flow on said elbow multiplied by a variable representing the bandwidth of end-to-end flow over a path from one of said source nodes to one of said destination nodes.

29. The method of claim 25 wherein said optimization function is based on said proportion of data traffic flow on each of said links and said observed bandwidth of data traffic crossing each of said links.

30. The method of claim 25 wherein said optimization function is based on said proportion of data traffic flow on each of said elbows and said observed bandwidth of data traffic crossing each of said elbows.

31. The method of claim 25 further comprising utilizing a set of constraints from a traffic flow model along with said optimization function to generate data traffic matrix estimates.

32. The method of claim 31 wherein the traffic flow model is a link-based traffic flow model.

33. The method of claim 31 wherein the traffic flow model is an elbow-based traffic flow model.

34. The method of claim 25 wherein utilizing said optimization function comprises utilizing a variable $o_{u,v,i}$ for each flow and link and constraint equations according to:

$$o_{u,v,i} \geq \frac{b_i}{|F_i|} - a_{u,v,i} \times x_{u,v}; \text{ and}$$

$$o_{u,v,i} \geq a_{u,v,i} \times x_{u,v} - \frac{b_i}{|F_i|}$$

wherein:
  $F_i$: set of flows on link i;
  $a_{u,v,i}$: proportion of flow from node u to node v which is routed over link i;
  $b_i$: observed bandwidth of data traffic crossing link i; and
  $x_{u,v}$: variable representing bandwidth of flow from node u to node v.

35. The method of claim 34 further comprising solving a linear programming problem with said optimization function and wherein said optimization function is defined as:

$$\text{minimize} \left( \sum_{i \in I} \sum_{(u,v) \in F_i} o_{u,v,i} \right).$$

36. The method of claim 25 wherein calculating data traffic flow comprises utilizing a variable $o_{u,v,i,j}$ and constraint equations according to:

$$o_{u,v,i,j} \geq \frac{b_{i,j}}{|F_{i,j}|} - a_{u,v,i,j} \times x_{u,v}; \text{ and}$$

$$o_{u,v,i,j} \geq a_{u,v,i,j} \times x_{u,v} - \frac{b_{i,j}}{|F_{i,j}|}$$

wherein:
  $F_{(i,j)}$: set of flows which traverse elbow (i,j);
  $a_{u,v,i,j}$: proportion of flow from node u to node v which is routed over elbow (i,j);
  $b_{(i,j)}$: observed bandwidth of data traffic crossing elbow (i,j); and
  $x_{u,v}$: variable representing bandwidth of flow from node u to node v.

37. The method of claim 36 further comprising solving a linear programming problem with said optimization function and wherein said optimization function is defined as:

$$\text{minimize} \left( \sum_{i \in I} \sum_{(u,v) \in F_i} o_{u,v,i} + \sum_{(i,j) \in E} \sum_{(u,v) \in F_{i,j}} o_{u,v,i,j} \right).$$

38. A method of calculating at a network device, data traffic flow in a communications network comprising a plurality of source nodes, a plurality of destination nodes, and a plurality of intermediate nodes, each of said plurality of intermediate nodes including at least one elbow comprising one ingress interface and one egress interface of the intermediate node, the nodes being connected to one another by links, the method comprising:
  obtaining local data traffic measurements including observed bandwidth of data traffic crossing each of said links or said elbows; and
  determining local estimates for at least a portion of data traffic flows in the network based on said obtained local data traffic measurements, wherein all flows which contribute to each of said local estimates are estimated to be equal to one another;
  calculating end-to-end data traffic flow estimates utilizing an optimization function at a processor at the network device; and
  utilizing a set of constraints from a traffic flow model along with said function to generate data traffic matrix estimates.

39. The method of claim 38 further comprising solving a linear programming problem with said optimization function.

40. A non-transitory computer readable storage medium encoded with a computer program containing computer executable codes for calculating data traffic flow in a communications network comprising a plurality of source nodes, a plurality of destination nodes, and a plurality of intermediate nodes, each of said plurality of intermediate nodes including at least one elbow comprising one ingress interface and one egress interface of one of the intermediate nodes, the computer program comprising:
  code that obtains local data traffic measurements at each of said elbows, wherein said local data traffic measurements comprise data traffic flowing through the elbows based on data traffic arriving at the intermediate node via said ingress interface and leaving the intermediate node via said egress interface; and
  code that utilizes said local data traffic measurements in said data traffic flow calculations;
  wherein code that obtains said local data traffic measurements comprises code that classifies and measures said data traffic based on how said data traffic passes across the intermediate node, said code that measures comprising code that measures a proportion of said data traffic routed over each of the elbows.

41. The computer-readable storage medium of claim 40 wherein code that utilizes said local data traffic measurements comprises code that generates data traffic matrix information.

42. A non-transitory computer readable storage medium encoded with a computer program containing computer executable codes for calculating end-to-end data traffic flow estimates in a communications network comprising a plurality of source nodes, a plurality of destination nodes, and a plurality of intermediate nodes, each of said plurality of intermediate nodes including at least one elbow comprising one ingress interface and one egress interface of the intermediate node, the nodes being connected to one another by links, the computer program comprising:
  code that obtains local data traffic measurements including proportion of data traffic flow from one of said source nodes to one of said destination nodes which is routed over each of said elbows and observed bandwidth of data traffic crossing each of said elbows;
  code that determines local estimates of flow for each of said elbows using said local data traffic measurements;
  code that calculates end-to-end data traffic flow estimates based on said local flow estimates; and
  a computer-readable medium that stores the codes.

43. An apparatus for calculating at a network device, data traffic flow in a communications network comprising a plurality of source nodes, a plurality of destination nodes, and a plurality of intermediate nodes, each of said plurality of intermediate nodes including at least one elbow comprising one ingress interface and one egress interface of the intermediate node, the nodes being connected to one another by links, the apparatus comprising:
  a processor for:
    obtaining local data traffic measurements including proportion of data traffic flow from one of said source nodes to one of said destination nodes which is routed over each of said links or said elbows, and observed bandwidth of data traffic crossing each of said links or said elbows;
    determining local estimates of flow for each of said links or said elbows using said local data traffic measurements; and
    calculating end-to-end data traffic flow estimates based on said local flow estimates; and
  memory for storing said local data traffic measurements;
  wherein calculating end-to-end data traffic flow estimates comprises utilizing an optimization function and wherein said optimization function is based on the difference between the observed bandwidth of data traffic crossing said link or said elbow divided by the number of flows on said link or said elbow and the proportion of data traffic flow on said link or said elbow multiplied by a variable representing the bandwidth of end-to-end flow over a path from one of said source nodes to one of said destination nodes.

44. An apparatus for calculating at a network device, data traffic flow in a communications network comprising a plurality of source nodes, a plurality of destination nodes, and a plurality of intermediate nodes, each of said plurality of intermediate nodes including at least one elbow comprising one ingress interface and one egress interface of the intermediate node, the apparatus comprising:
  a processor for:
    obtaining local data traffic measurements at each of said elbows, wherein said local data traffic measurements comprise data traffic flowing through the elbows based on data traffic arriving at the intermediate node via said ingress interface and leaving the intermediate node via said egress interface;
    performing said data traffic flow calculations utilizing said local data traffic measurements; and
    generating end-to-end data traffic flow estimates, wherein generating said end-to-end data traffic flow estimates comprises utilizing a path load feedback estimation function; and
  memory for storing said local data traffic measurements.

* * * * *